US008670773B2

United States Patent
Nobukiyo

(10) Patent No.: US 8,670,773 B2
(45) Date of Patent: Mar. 11, 2014

(54) CONTROL DEVICE, COMMUNICATION SYSTEM, RESOURCE ALLOCATION METHOD, AND RECORDING MEDIUM CONTAINING PROGRAM

(75) Inventor: Takahiro Nobukiyo, Tokyo (JP)

(73) Assignee: NEC Corporation, Tokyo (JP)

( * ) Notice: Subject to any disclaimer, the term of this patent is extended or adjusted under 35 U.S.C. 154(b) by 509 days.

(21) Appl. No.: 12/921,053

(22) PCT Filed: Feb. 12, 2009

(86) PCT No.: PCT/JP2009/052277
§ 371 (c)(1),
(2), (4) Date: Sep. 3, 2010

(87) PCT Pub. No.: WO2009/122776
PCT Pub. Date: Oct. 8, 2009

(65) Prior Publication Data
US 2011/0022714 A1    Jan. 27, 2011

(30) Foreign Application Priority Data
Apr. 2, 2008 (JP) ................................. 2008-095784

(51) Int. Cl.
*H04W 40/00* (2009.01)
(52) U.S. Cl.
USPC ......................................... 455/447; 455/522
(58) Field of Classification Search
USPC .......... 455/63.1, 67.11, 464, 447, 450, 452.2, 455/522
See application file for complete search history.

(56) References Cited

U.S. PATENT DOCUMENTS 7,450,905 B2 * 11/2008 Pan .............................. 455/63.1
7,457,588 B2 * 11/2008 Love et al. ................. 455/67.11
8,005,037 B2 * 8/2011 Ishii et al. ..................... 370/328

FOREIGN PATENT DOCUMENTS

| JP | 9-500778 A | 1/1997 |
| JP | 9-163431 A | 6/1997 |
| JP | 11-313365 A | 11/1999 |
| JP | 2000316183 A | 11/2000 |
| JP | 2001517893 A | 10/2001 |
| JP | 2006033826 A | 2/2006 |
| JP | 2007533224 A | 11/2007 |
| JP | 2008011420 A | 1/2008 |

OTHER PUBLICATIONS

International Search Report for PCT/JP2009/052277 mailed Mar. 17, 2009.
Japanese Office Action for JP2010-505429 mailed on Feb. 19, 2013.
Japanese Office Action for JP2010-505429 mailed on Nov. 6, 2012.

(Continued)

*Primary Examiner* — Ping Hsieh
(74) *Attorney, Agent, or Firm* — Sughrue Mion, PLLC

(57) ABSTRACT

A control device, which is placed in a communication system in which the same resource is used in a plurality of communication areas, includes a communication function unit having a function of communicating with a plurality of user equipments existing in at least one communication area under control of the control device, and a resource allocation unit that, when an uplink resource of a communication area adjacent to one communication area is allocated to a first user equipment, allocates the same uplink resource of the one communication area to a second user equipment with an interference power to the adjacent communication area equal to or lower than an interference threshold and a communication quality equal to or higher than a quality threshold.

18 Claims, 16 Drawing Sheets

(56) References Cited

OTHER PUBLICATIONS

NTT DoCoMo, Frequency Domain Channel-Dependent Scheduling Considering Interference to Neighbouring Cell for E-UTRA Uplink, R1-070099, 3GPP, Jan. 15, 2007.

NTT DoCoMo, Fujitsu, Mitsubishi Electric, NEC, Sharp, Toshiba Corporation, Frequency Domain Channel-Dependent Scheduling with Adaptive Transmission Bandwidth of Pilot Channel for CQI Measurement for E-UTRA Uplink, R1-060787, 3GPP, Mar. 31, 2006.

Alcatel-Lucent, On the Overload Indicator Interworking with ICIC, R1-080447, 3GPP, Jan. 18, 2008.

Ericsson, On Inter-cell Interference Coordination Schemes without/with Traffic Load Indication, R1-074444, 3GPP, Oct. 12, 2007.

* cited by examiner

| No | USER ID | SECTOR NO | RB NO | SELECTION INDEX |
|---|---|---|---|---|
| 1 | USER ID1 | S11 | 5 | $M_{1,5}(n)$ |
| 2 | USER ID2 | S13 | 3 | $M_{2,3}(n)$ |
| 3 | USER ID1 | S11 | 9 | $M_{1,9}(n)$ |
| ⋮ | ⋮ | ⋮ | ⋮ | ⋮ |
| n | USER ID5 | S12 | 2 | $M_{5,2}(n)$ |

Fig. 8

# CONTROL DEVICE, COMMUNICATION SYSTEM, RESOURCE ALLOCATION METHOD, AND RECORDING MEDIUM CONTAINING PROGRAM

This application is the National Phase of PCT/JP2009/052277, filed Feb. 12, 2009, which is based upon and claims the benefit of priority from Japanese patent application No. 2008-095784 filed on Apr. 2, 2008, the disclosure of which is incorporated herein in its entirety by reference.

TECHNICAL FIELD

The present invention relates to resource allocation of a communication system in which the same resource is used in adjacent communication areas and, particularly, to a resource allocation technique in consideration of interference between adjacent communication areas.

BACKGROUND ART

In a radio communication system, a plurality of base stations are placed. Each base station performs communication with a radio communication user equipment (which is referred to hereinafter simply as a user equipment) in a communication area. The communication area is called a cell. Further, in order to increase the number of user equipments with which simultaneous communication is possible, an antenna may be provided with directivity, and the cell may be divided into a plurality of regions. The divided region is called a sector. In the case of using the same radio resource such as a frequency in a plurality of communication areas, there is a possibility that the communication path quality is degraded due to interference from an adjacent cell or interference from an adjacent sector. In this behalf, it is considered that the adjacent sector interference can be reduced to low enough by the directivity of the antenna.

However, at the sector boundary, because the antenna gain is equal, the communication path quality is significantly degraded due to adjacent sector interference. Further, because of shadowing in which a propagation loss varies by the effect of a building or the like, there is a case where the communication path quality is significantly degraded due to adjacent sector interference also in a user equipment not at the sector boundary.

As a technique of reducing or avoiding interference between cells that solves the above concern, a method of avoiding allocation in one's own cell or a method of reducing a transmission power depending on the frequency group allocation status in an adjacent cell or the like is known. For example, in Patent Document 1, a time-frequency group allocation method for interference reduction in an OFDMA (Orthogonal Frequency Division Multiple Access) downlink is disclosed. In Patent Document 1, a central entity that is connected to a plurality of base stations is placed, and the central entity manages scheduling of each base station. A user equipment measures a reception power of a pilot signal from each base station. The central entity performs scheduling according to the reception power reported from the user equipment in consideration of interference. Further, as an exemplary embodiment, a technique is disclosed in which frequency groups of each base station are allocated to user equipments in the area, and, for the frequency group allocated to a user equipment in a service overlap region, an adjacent base station reduces a transmission power. According to this technique, in the case of allocating a frequency group to a user equipment at the sector boundary, which is the service overlap region, for example, the same frequency group is allocated by uniformly reducing the transmission power, or the allocation of the same frequency group is avoided in an adjacent sector.

Patent Document 1

Japanese Unexamined Patent Application Publication No. 2006-033826

DISCLOSURE OF INVENTION

Technical Problem

Application of the scheduling method of Patent Document 1 to the uplink enables improvement of the throughput of a user equipment which is largely affected by adjacent sector interference such as at the sector boundary. On the other hand, there is a problem that the throughput of a user equipment in the adjacent sector decreases significantly.

FIG. 17 is a view showing a relationship of user equipments to which a resource is allocated by the related technique. A dotted line in each sector indicates the intensity of an antenna beam. An arrow from each user equipment to a base station indicates transmission of an uplink. As shown in FIG. 17, in a sector 1, because a user equipment 1a is located at the sector boundary, it is largely affected by the interference from an adjacent sector 2. When allocating a frequency group to the user equipment 1a, any of user equipments 2a, 2b and 2c is selected in the adjacent sector 2.

A transmission power P is set as follows, for example, when controlled with a target quality $SINR_{target}$ (Signal to Interference and Noise Ratio). The transmission power is applied to the user equipment 1a.

$$P[dBm] = \text{MEDIUM}(P_{min}, P_o - PL, P_{max}) \quad \text{Expression (1)}$$

$$P_o[dB] = SINR_{target} + N + (1 + IoT) \quad \text{Expression (2)}$$

$P_{min}$ and $P_{max}$ indicate the minimum transmission power and the maximum transmission power, $P_o$ indicates a power offset represented by $SINR_{target}$, PL indicates a propagation loss, N indicates thermal noise, and IoT indicates interference over thermal. MEDIUM(a, b, c) is a function of selecting the medium value of a, b and c.

Further, because a user equipment in an adjacent sector to which the same frequency group as a user equipment at the sector boundary is allocated reduces its transmission power, the transmission power is set as in Expression (3). The transmission power is applied to the user equipments 2a, 2b and 2c. Thus, when the transmission power of the user equipments 2a, 2b and 2c is reduced, the throughput of the sector 2 decreases significantly.

$$P[dBm] = \text{MEDIUM}(P_{min}, P_o - PL - \Delta_{bound}, P_{max}) \quad \text{Expression (3)}$$

Note that $\Delta_{bound}$ indicates an offset for reducing an interference power to a user equipment at the sector boundary. Further, in the case of not reducing the transmission power, the allocation of a resource which is used by the user equipment 1a is avoided in the sector 2.

In this manner, in communication areas using the same resource (e.g. sectors or cells using the same frequency block), the transmission power of a selected user equipment is largely reduced, or the allocation for a user equipment is avoided in the adjacent communication area. There is thus a problem that the throughput of the adjacent communication area decreases significantly.

An object of the present invention is, when allocating a resource to a user equipment which is largely affected by interference of an adjacent communication area in an uplink, to improve the throughput of an adjacent communication area using the same resource as well as suppressing degradation of the throughput of the user equipment to which the resource is allocated.

Technical Solution

One aspect of the present invention is a control device placed in a communication system where the same resource is used in a plurality of communication areas, which includes a communication function means having a function of communicating with a plurality of user equipments existing in at least one communication area under one's own control, and a resource allocation means for, when an uplink resource of an adjacent communication area to one communication area is allocated to a first user equipment, allocating the same uplink resource of the one communication area to a second user equipment in which an interference power to the adjacent communication area is equal to or lower than an interference threshold and a communication quality is equal to or higher than a quality threshold.

One aspect of the present invention is a communication system which includes the above-described control device, and a user equipment to which an uplink resource is allocated by the control device.

One aspect of the present invention is a resource allocation method in a communication system where the same resource is used in a plurality of communication areas, which includes checking an uplink resource allocation status of an adjacent communication area to one communication area; and allocating, when an uplink resource of the adjacent communication area is allocated to a first user equipment, the same uplink resource of the one communication area to a second user equipment in which an interference power to the adjacent communication area is equal to or lower than an interference threshold and a communication quality is equal to or higher than a quality threshold.

One aspect of the present invention is a program for allocating a resource in a communication system where the same resource is used in one communication area and an adjacent communication area, the program causing a computer to execute a process including a step of checking an uplink resource allocation status of the adjacent communication area; and a step of allocating, when an uplink resource of the adjacent communication area is allocated to a first user equipment, the same uplink resource of the one communication area to a second user equipment in which an interference power to the adjacent communication area is equal to or lower than an interference threshold and a communication quality is equal to or higher than a quality threshold. The program is stored in a computer readable recording medium.

Advantageous Effects

According to the present invention, when allocating a resource to a user equipment which is largely affected by interference of an adjacent communication area in an uplink, it is possible to suppress degradation of the throughput of the user equipment to which the resource is allocated and also improve the throughput of an adjacent communication area using the same resource.

BRIEF DESCRIPTION OF DRAWINGS

FIG. 8 is a view showing an example of a list according to the first exemplary embodiment;

EXPLANATION OF REFERENCE

BS1 to BS3 BASE STATION
C1 to C3 CELL
S11 to S13, S21 to S23, S31 to S33 SECTOR
UE111 to 112, UE121 to 123, UE131 to 133 USER EQUIPMENT
1 CONTROL DEVICE
10 COMMUNICATION FUNCTION UNIT
11 COMMUNICATION FUNCTION UNIT
12 UE INFORMATION MANAGEMENT UNIT
20 RESOURCE ALLOCATION UNIT
21 LIST CREATION UNIT
22 ALLOCATION UNIT
101 UE OPERATION UNIT
102 SIGNAL MEASUREMENT UNIT
111 BS OPERATION UNIT
112 UE INFORMATION MANAGEMENT UNIT
113, 123 RESOURCE ALLOCATION UNIT

124 CONGESTION INFORMATION CALCULATION UNIT

BEST MODE FOR CARRYING OUT THE INVENTION

Exemplary embodiments of the present invention will be described hereinbelow with reference to the drawings. The following description and the drawings are appropriately shortened and simplified to clarify the explanation. In the figures, the identical reference symbols denote identical structural elements and the redundant explanation thereof is omitted.

Figure 1:
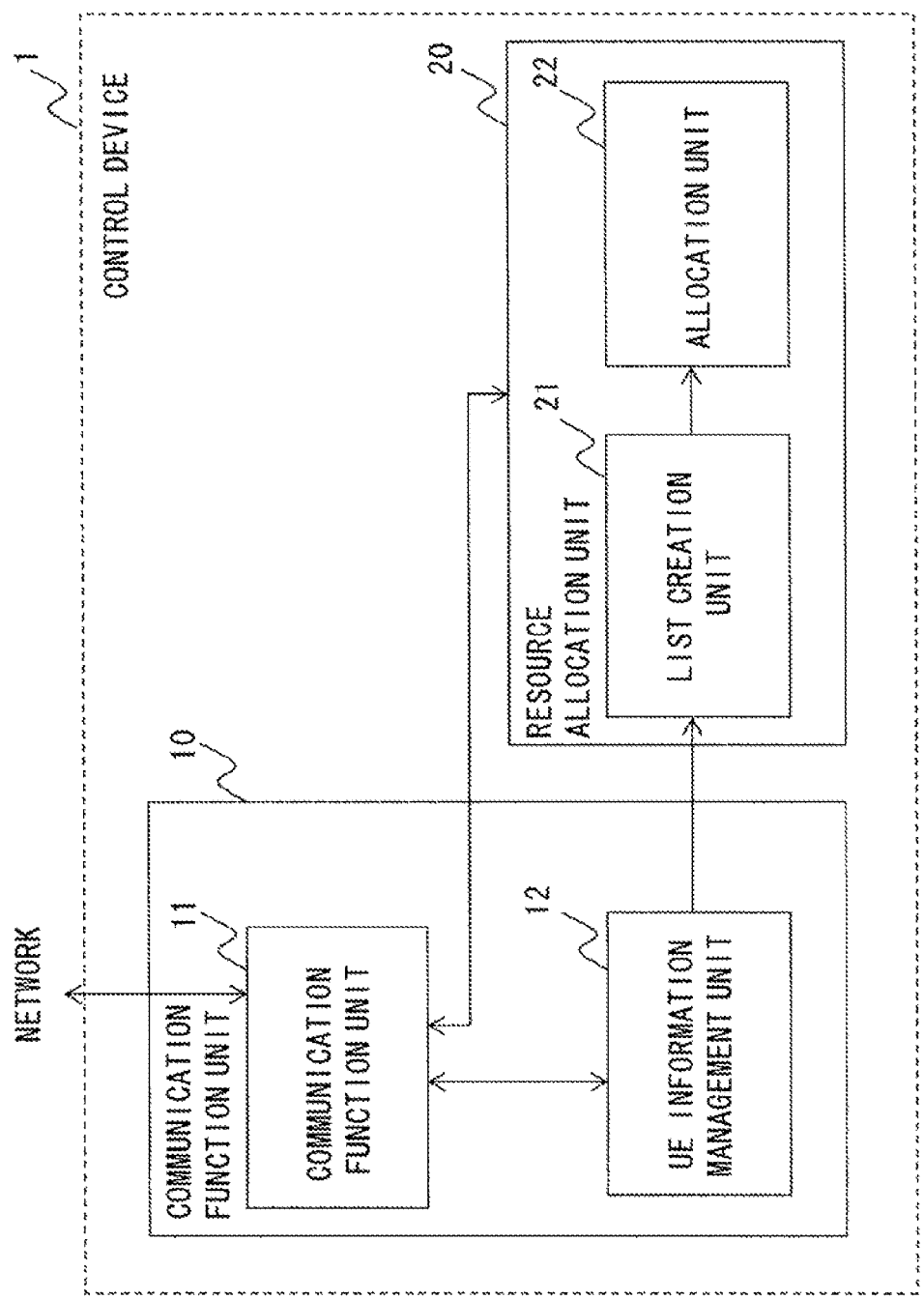
FIG. 1 is a block diagram showing an exemplary configuration of a control device according to the present invention.

The overview of a control device that performs allocation of a resource is described firstly. FIG. 1 is a block diagram showing an exemplary configuration of a control device according to the present invention. A control device 1 includes a communication function unit 10 and a resource allocation unit 20. The control device 1 is placed in a region where a plurality of adjacent communication areas use the same resource. The resource is divided into a plurality of frequency blocks, for example. It is assumed that the control device 1 allocates a user equipment with respect to each frequency block. The adjacent communication area indicates, with regard to one communication area, a communication area to which the boundary is adjacent.

The communication function unit 10 has a function of communicating with a plurality of user equipments that are located in at least one communication area which is locally controlled. In this example, the communication function unit 10 includes a communication function unit 11 and a UE information management unit 12. The communication function unit 11 has a function of transmitting and receiving data to and from a user equipment through a network. Further, the communication function unit 11 transmits a downlink common signal for each communication area and receives a measurement result of the downlink common signal from the plurality of user equipments. The UE information management unit 12 has a storage area that stores user equipment information notified from a plurality of user equipments and manages the user equipment information. Further, the UE information management unit 12 manages the received measurement result and calculates communication quality and an interference power based on the measurement result.

The resource allocation unit 20 allocates resources to a plurality of user equipments. When an uplink resource of a communication area adjacent to one communication area is allocated to a user equipment, the resource allocation unit 20 allocates the same uplink resource of one communication area to a user equipment that maintains the communication quality (estimated quality) that is equal to or higher than a predetermined quality level (quality threshold, minimum required quality) and the interference power that is equal to or lower than a predetermined interference level (interference threshold). When a user equipment is not allocated for the uplink resource of the adjacent communication area, a user equipment that maintains the communication quality (estimated quality) that is equal to or higher than a predetermined quality level (quality threshold) is allocated for the same uplink resource of one communication area.

For example, when a resource of a communication area X is already allocated to a user equipment A, the resource allocation unit 20 allocates the same resource of a communication area Y to a user equipment B in which the interference power to the communication area X is equal to or lower than an interference threshold, and the communication quality is equal to or higher than a quality threshold. Further, the resource allocation unit 20 selects a user equipment for allocation by adjusting the transmission power of the user equipment B.

As an exemplary embodiment of the resource allocation unit 20, FIG. 1 shows a case where the function is divided into a list creation unit 21 and an allocation unit 22.

The list creation unit 21 calculates selection indexes when each of a plurality of frequency blocks is allocated to a plurality of user equipments. It then creates a list of the calculated selection indexes arranged in descending order. The selection index is an index that indicates a quality when a user equipment is allocated for the frequency block, and it is one value for determining the precedence of allocation. A specific example of the selection index is described later.

The allocation unit 22 first selects a candidate frequency block to be allocated to a user equipment in the order of the created list. Next, when the same frequency block is allocated to a user equipment in an adjacent communication area, the allocation unit 22 makes the candidate frequency block allocable to a user equipment with an interference power equal to or lower than an interference threshold and a communication quality equal to or higher than a quality threshold. Further, when it is not allocated to a user equipment, the allocation unit 22 makes the candidate frequency block allocable to a user equipment with a communication quality equal to or higher than the quality threshold. The allocation unit 22 repeats this procedure in the order of the list and thereby allocates a frequency blocks to the user equipment. Further, for a user equipment in which the condition is not satisfied, the allocation unit 22 allocates a frequency block by reducing a transmission power within the range of maintaining the communication quality.

The overview of the control device and the resource allocation method of the control device according to the present invention is as described above. Note that the configuration of the communication function unit 10 and the resource allocation unit 20 is one example, and it is not limited to the exemplary configuration of FIG. 1. Although the function of the resource allocation unit 20 is divided into the list creation unit 21 and the allocation unit 22 to clarify the explanation thereof, the resource allocation unit 20 may implement the two functions. In the following explanation, the case where the resource allocation unit 20 has the two functions is used for explanation.

Exemplary embodiments of the present invention are described hereinafter in detail. The case where the control device 1 shown in FIG. 1 is applied to the following communication system is described as a specific example. One example is the case where a plurality of communication areas are a plurality of sectors that are divided from a cell, the control device 1 is a base station that is placed in the cell, and the resource allocation unit 20 allocates a resource to a plurality of user equipments that exist in the plurality of sectors. Another example is the case where a plurality of communication areas are a plurality of different cells in which base stations are placed respectively, the control device 1 is a base station that is placed in one cell, the communication function unit 10 acquires user equipment allocation information from an adjacent cell, the resource allocation unit 20 determines whether a user equipment is allocated for the adjacent cell based on the user equipment allocation information and allocates a resource to a plurality of user equipments in the cell. Further, in each of exemplary embodiments described below, a base station is used for explanation as an example of the control device 1.

First Exemplary Embodiment

Figure 2:
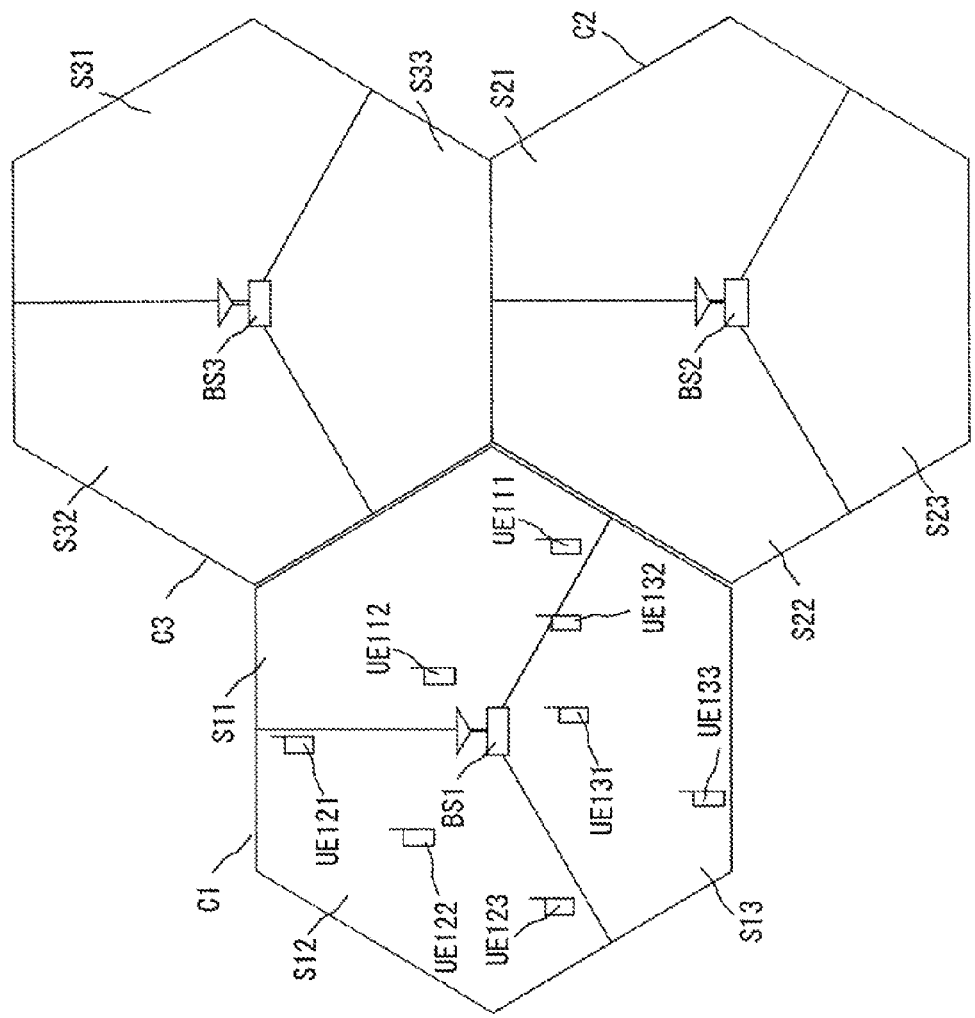
FIG. 2 is a block diagram showing an example of a radio communication system according to a first exemplary embodiment.

A first exemplary embodiment of the present invention is described hereinafter with reference to the drawings. FIG. 2 is a view showing an example of a radio communication system to which the present invention is applied. In each of exemplary embodiments described below, 3GPP (3rd Generation Partnership Project) LTE (Long Term Evolution) uplink is used for explanation as an example of a communication system. In the LTE uplink, SC-FDMA (Single Carrier-FDMA), which is one of FDMA, is employed as a radio access scheme.

Figure 3:
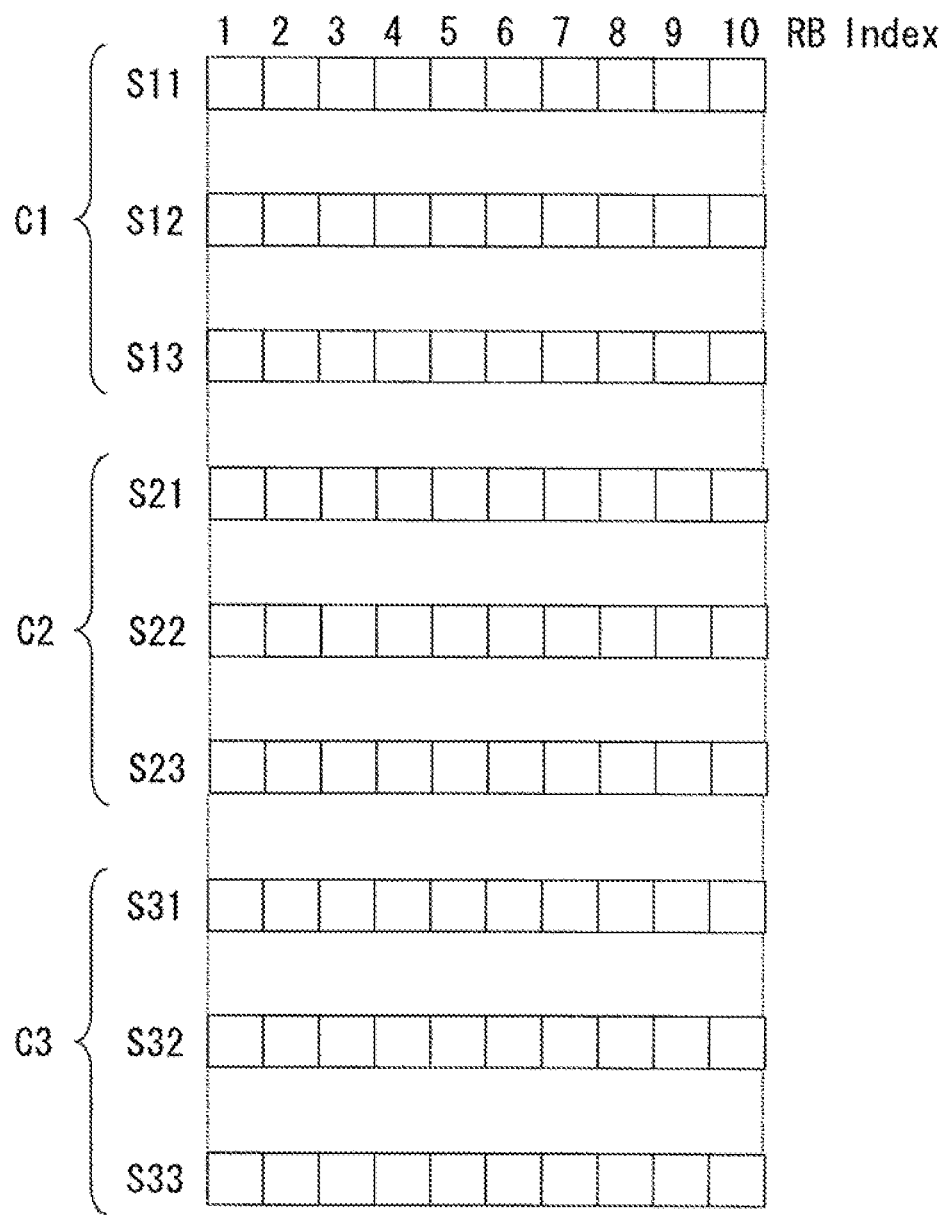
FIG. 3 is a view showing an image of a frequency block that can be used repeatedly in all sectors.

A base station BS1 provides a radio communication service in a cell C1, its antenna is provided with directivity, and a three-sector cell structure in which the cell is divided into three sectors S11 to S13 is adopted. In LTE, a radio band is divided, and it is allocated to a user in units of the divided frequency blocks (RB). In this exemplary embodiment, as shown in FIG. 3, all RBs can be used repeatedly in all sectors. FIG. 3 is an example in which a radio band is divided into ten RBs. In the sector S11, user equipments UE111 to 112 exist. The same applies to the other sectors S12 to 13 under control of the base station BS1. For simplification of the drawing, user equipments existing in the cells C2 and C3 are omitted. Further, although the number of base stations is three for simplification of explanation, the present invention is not limited thereto. Furthermore, although the sector structure is a three-sector cell structure, other multi-sector structures may be employed. Furthermore, although not shown, the respective base stations are connected through a network, and data can be transmitted and received among the base stations.

Further, in the following description, an "adjacent sector" indicates a sector with which the base station is the same and the sector boundary is adjacent, and an "adjacent base station cell" indicates a sector with which the base station is different and the cell boundary is adjacent. In FIG. 2, the adjacent sector of the sector S11 is S12 and S13 those sector boundaries are adjacent. The adjacent base station cell of the base station BS1 is S22, S32 and S33 whose cell boundaries are adjacent to the cell C1.

Figure 4:
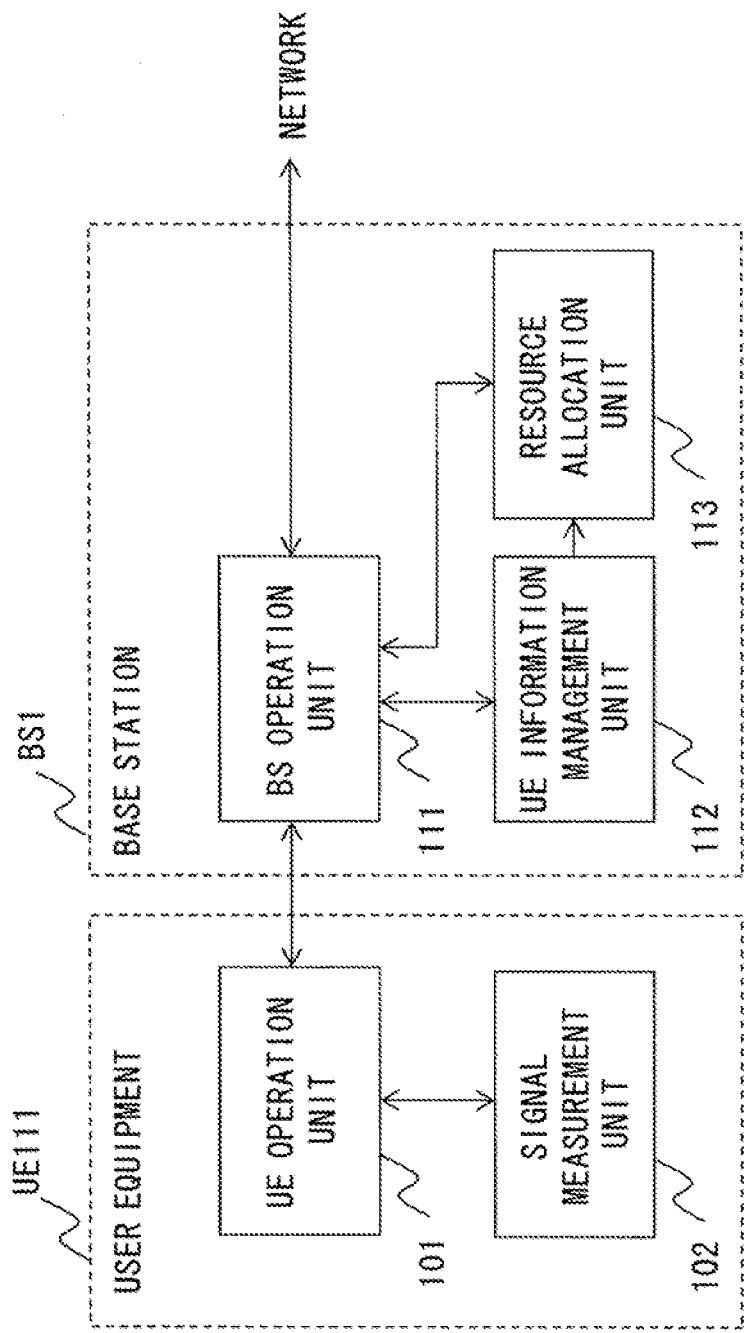
FIG. 4 is a block diagram showing an exemplary basic configuration of a communication system according to the first exemplary embodiment.

FIG. 4 is a block diagram showing an exemplary basic configuration of the radio communication system of FIG. 2. For simplification, only the user equipment UE111 and the base station BS1 are shown therein.

Referring to FIG. 4, the user equipment UE111 includes a UE operation unit 101 and a signal measurement unit 102. Further, the base station BS1 includes a BS operation unit 111, a UE information management unit 112, and a resource allocation unit 113. The UE operation unit 101 has a function of transmitting propagation loss information that is output from the signal measurement unit 102 to the base station and a function of transmitting traffic by a resource allocated to the base station BS1. Further, the other functions of the UE operation unit 101 are equivalent functions of a user equipment that is generally used in the LTE system, and its configuration and operation are known and thus not described. In LTE, a cell search is carried out by using a synchronization channel (SCH).

The BS operation unit 111 has a function of transmitting control information such as resource allocation information to a user equipment, a function of receiving data and control information such as propagation loss information (hereinafter, "propagation loss information" is referred to as "PL information") from a user equipment, a function of transmitting and receiving data and control information between base stations, and a measurement function related to a reception power. Further, the other functions of the BS operation unit 111 are equivalent functions of a base station that is generally used in the LTE system, and its configuration and operation are known and thus not described. The measurement related to a reception power indicates measuring IoT (Interference over Thermal), RoT (Rise over Thermal) or the like.

The UE information management unit 112 has a function of managing PL information transmitted from a user equipment.

Further, the BS operation unit 111 and the UE information management unit 112 are one aspect of the configuration of the communication function unit 10 of FIG. 1.

The resource allocation unit 113 has a function of determining resource allocation by using PL information. The resource allocation unit 113 is one aspect of the resource allocation unit 20 of FIG. 1.

Figure 5:
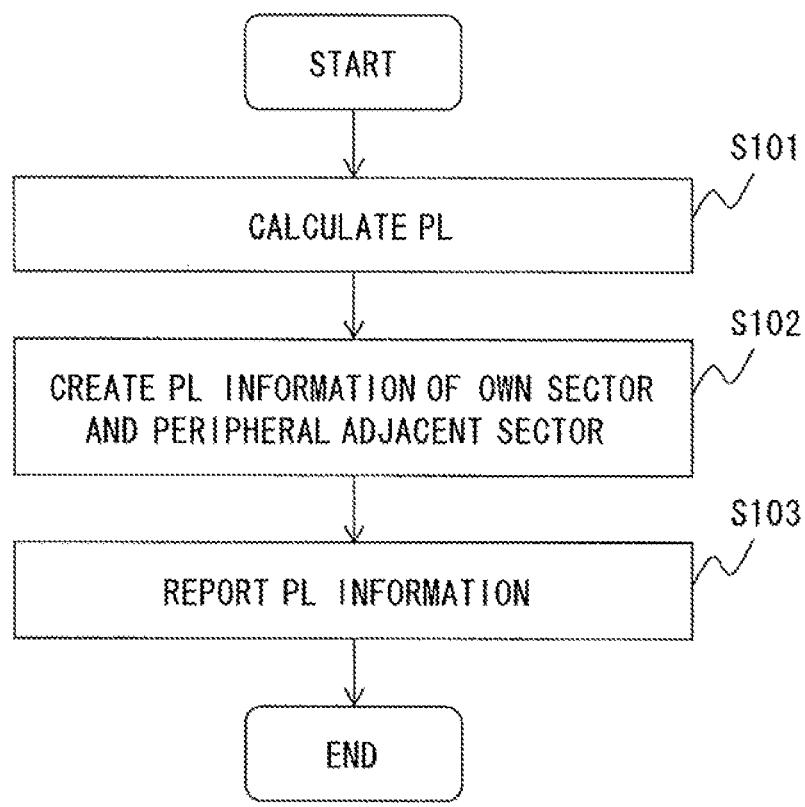
FIG. 5 is a flowchart showing a procedure to create PL information according to the first exemplary embodiment.

The operation of the exemplary embodiment is described hereinafter with reference to the drawings. FIG. 5 is a flowchart showing a procedure for a user equipment to create PL information, and it shows an operating procedure to create PL information by calculating PL based on the reception intensity of a downlink pilot signal that is transmitted with respect to each sector and report the PL information to a base station. The signal measurement unit 102 calculates PL of its own sector and a peripheral sector based on a reception result of a pilot signal (downlink common signal) (S101). The PL calculation of a sector p for a user j is performed according to the following expression.

$$PL_{j,p}[dB] = P\_tx_p[dBm] - P\_rx_{j,p}[dBm] \qquad \text{Expression (4)}$$

Note that $P\_tx_p$ and $P\_rx_{j,p}$ respectively indicate the average transmission power of a pilot signal of a measurement sector and the average reception power by a user j. In LTE, as a control signal, a transmission power value of a pilot signal is notified from a base station to a user equipment. Basically, it is considered that the transmission power of a pilot signal is always constant. Next, PL information which is a set of sector identification information ($ID_i$) such as a sector number of each sector and PL is created (S102) and reported to the base station (S103).

This flowchart may be executed at a given cycle notified in advance from a base station or executed based on an instruction from a base station. Because measurement accuracy is necessary for the PL calculation, it is desirable to execute it with a certain time interval.

Figure 6:
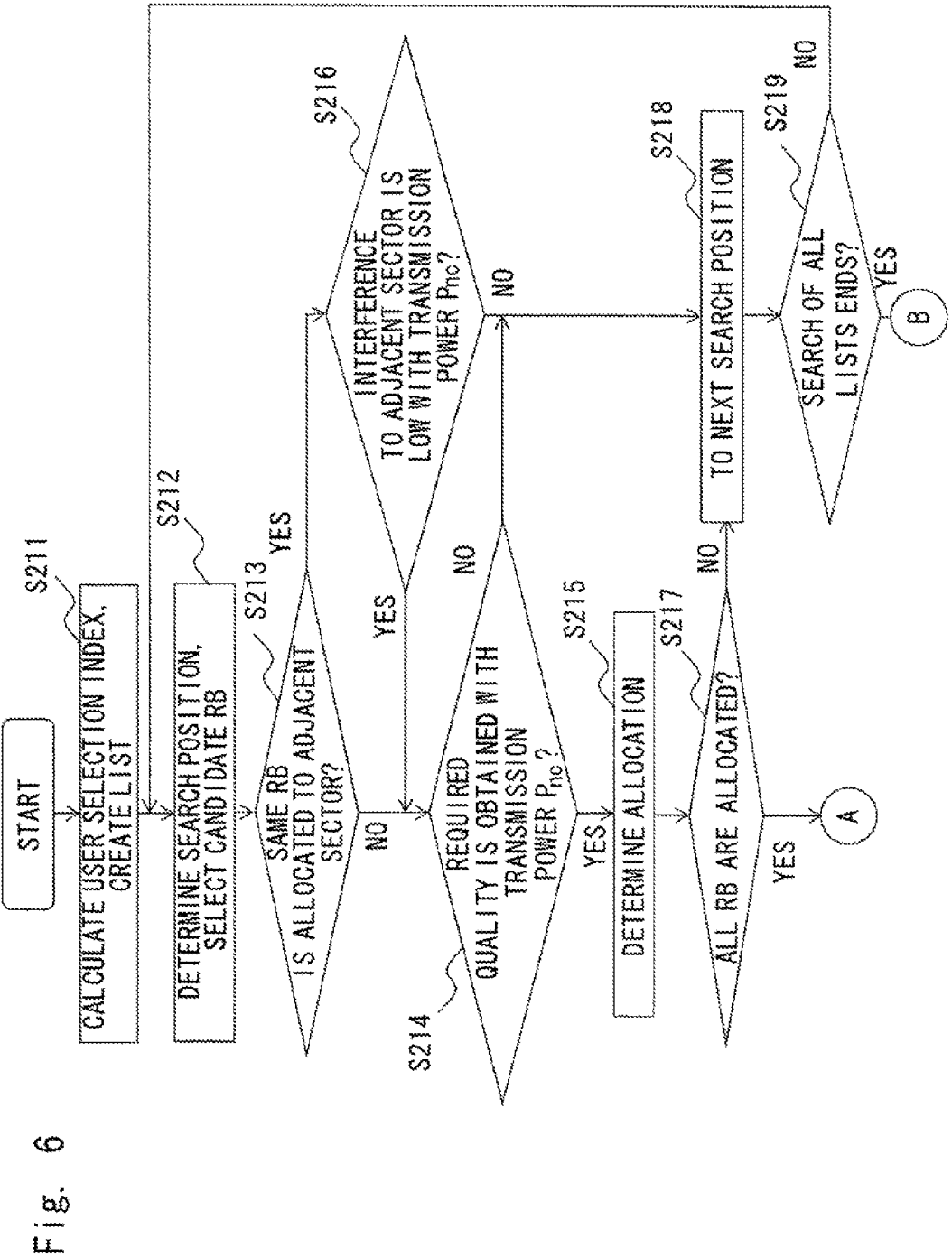
FIG. 6 is a flowchart showing an operating procedure to select a user to which a resource is allocated according to the first exemplary embodiment.
Figure 7:
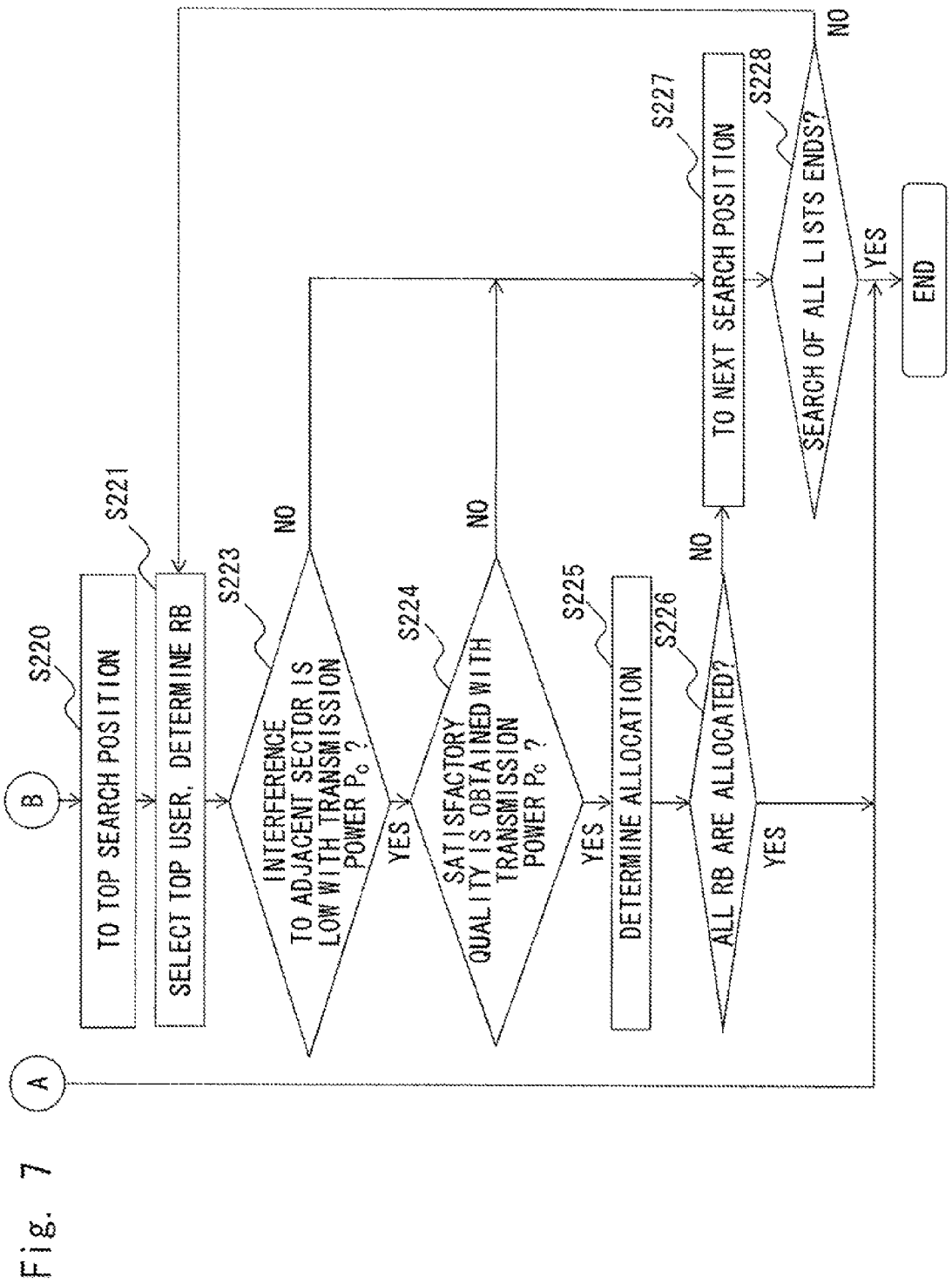
FIG. 7 is a flowchart showing an operating procedure to select a user to which a resource is allocated according to the first exemplary embodiment.

FIGS. 6 and 7 are flowcharts showing operating procedures for a base station to determine a user equipment (user) to which a resource is allocated by using PL information. In LTE, a scheduling method in which a base station allocates RB to users depending on the reception state of each user equipment is considered. The base station allocates RB of all of the three sectors under its control at once. Further, proportional fairness (PF) is supposed for scheduling. The PF scheduling is a scheduling method with consideration of the total throughput and the fairness of throughput among users. The PF scheduling is a scheme in which the average throughput of each RB and an available transmission rate based on the current communication quality are compared, and, when the reception state is good, a resource is allocated to a user who has not performed communication in the past.

In this exemplary embodiment, a selection index $M_{j,k}(n)$ of the PF scheduling is defined as follows using the average throughput $T_j(n)$ of the user j in all RBs and the available transmission rate $R_{j,k}(n)$ of the user j at RB k (k-th RB), where n indicates time.

$$M_{j,k}(n) = \frac{R_{j,k}(n)}{T_j(n)} \qquad \text{Expression (5)}$$

The average throughput $T_j(n)$ is defined as follows, where b indicates a smoothing factor.

$$T_j(n+1) = \quad \text{Expression (6)}$$
$$\begin{cases} (1-b)\cdot T_{j(n)} + b\cdot R_{j,k}(n) & \text{(When user } j \text{ is selected)} \\ (1-b)\cdot T_{j(n)} & \text{(When user } j \text{ is not selected)} \end{cases}$$

The flowcharts of FIGS. 6 and 7 are described hereinafter. Before allocating RB, the resource allocation unit 113 calculates scheduling selection indexes defined in Expression (5), arranges them in descending order, and creates a list of selection indexes for a set of three sectors (S211). For example, when 15 users exist in the cell, 15 users×10 RBs=150 in FIG. 3, and the total number of selection indexes $M_{j,k}(n)$ is 150. FIG. 8 shows an example of the list. The list contains User ID, Sector No, RB No, and Selection index. In Sector No, a sector No in which a user with a user ID exists is stored. In RB No, RB No for which a selection index is calculated is stored.

Next, the resource allocation unit 113 starts the allocation of resources in the order of the list. The resource allocation unit 113 selects a user j with the maximum $M_{j,k}(n)$ among users which are not selected as the top user and from which allocated users are excluded as an allocation candidate and determines the RB to be allocated according to the selection rule (S212). It is assumed that a sector of the user j is p. The selection rule may be a method that extracts a user 1 with the maximum $M_{l,k}(n)$ with respect to each unallocated RB and sets RB with j=1 as a candidate of RB to be allocated to the user j, for example, or may be another method. In the uplink of LTE, when allocating a plurality of RBs to the same user, the RBs need to be adjacent to each other; therefore, although RB Index=1, 2, 3 can be allocated to the same user, RB Index=1, 3, 5 cannot be allocated to the same user. Therefore, in this exemplary embodiment, one or more successive RBs with the maximum transmission rate are selected.

Then, when the RB to be allocated to the selected user j is not yet allocated in an adjacent sector q (No in S213), the resource allocation unit 113 sets the transmission power $P_j$ to a normal transmission power $P_{nc}$ and calculates an estimated quality $SINR_{est}$ by using Expressions (7) to (9). When the estimated quality $SINR_{est}$ satisfies the minimum required quality $Thr\_SINR_{target}$ (quality threshold) (Yes in S214), the resource allocation to the user j is determined with the transmission power $P_{ac}$ (S215).

$$P_{nc}[\text{dBm}]=\text{MEDIUM}(P_{min}, P_o+PL_{j,p}, P_{max}) \quad \text{Expression (7)}$$

$$P_o[\text{dB}]=SINR_{target}+N+10\log_{10}(\text{IoT}+1) \quad \text{Expression (8)}$$

$$SINR_{target}[\text{dB}]=P_{nc}+PL_{j,p}-N-10\log_{10}(\text{IoT}+1)\geq Thr\_SINR_{target} \quad \text{Expression (9)}$$

The $SINR_{target}$ is a target quality. MEDIUM(a, b, c) is a function of selecting the medium value of a, b and c. $P_{min}$ and $P_{max}$ indicate the minimum transmission power and the maximum transmission power, respectively. N indicates thermal noise.

On the other hand, when the RB to be allocated is already allocated in the adjacent sector (Yes in S213), the resource allocation unit 113 calculates an interference power I to the adjacent sector in the case of setting the transmission power $P_j$ to the normal transmission power $P_{nc}$. When Expression (10) can be satisfied (Yes in S216), the determination of S214 is carried out. $P_1$ indicates a transmission power of a user 1 to which the same RB is allocated in the adjacent sector, and $ThrI_{1,q}[\text{dB}]$ indicates a threshold for determining an allowable interference power. By satisfying Expression (10), the interference power from the adjacent sector with respect to a desired signal can be suppressed to be a certain level or less.

$$\text{I}[\text{dBm}]=P_j+PL_{j,q}<=P_1+PL_{1,q}+ThrI_{1,q} \quad \text{Expression (10)}$$

After determining the allocation, when all RBs have been allocated (Yes in S217), the process ends. On the other hand, when all RBs have not been allocated (No in S217), the position to be selected as the top user from the list is updated (S218). The update is made so that the next position is not an allocated user. Then, when the search of all lists is not completed (No in S219), the process returns to the processing of S212.

When the search of all lists is completed (Yes in S219), because all RBs have been allocated, a user j with the maximum $M_{j,k}(n)$ among users which are not selected as the top user and from which allocated users are excluded is selected as an allocation candidate, and the RB to be allocated is determined according to the selection rule (S220).

Then, in the same manner as the case of setting a transmission power to the normal $P_{nc}$, the user j with the maximum $M_{j,k}(n)$ is selected as the top user from the list and set as an allocation candidate, and then the RB to be allocated is determined according to the selection rule (S221).

Then, the resource allocation unit 113 reduces the transmission power $P_j$ to the transmission power $P_c$ in Expression (11) for interference reduction. Further, it calculates the interference power I to the adjacent sector when it is set to the transmission power $P_c$ in Expression (11). When the interference power I satisfies Expression (10) (Yes in S223) and the estimated quality $SINR_{est}$ satisfies the required quality $Thr\_SINR_{target}$ (Yes in S224), the resource allocation unit 113 determines the resource allocation to the user j with the transmission power $P_c$ (S225). Note that $\Delta_{is}$ in Expression (11) is a parameter for reducing a transmission power, and it is preferably a value that can achieve a certain level of throughput.

$$P_c=\text{MEDIUM}(P_{min}, P_o+PL_{j,p}-\Delta_{is}, P_{max}) \quad \text{Expression (11)}$$

After the resource allocation unit 113 determines the resource allocation, when all RBs have been allocated (Yes in S226), the process ends. On the other hand, when all RBs have not been allocated (No in S226), the position to be selected as the top user is updated (S227). Then, when the search of all lists is not completed (No in S228), the process returns to the processing of S221.

Figure 9:
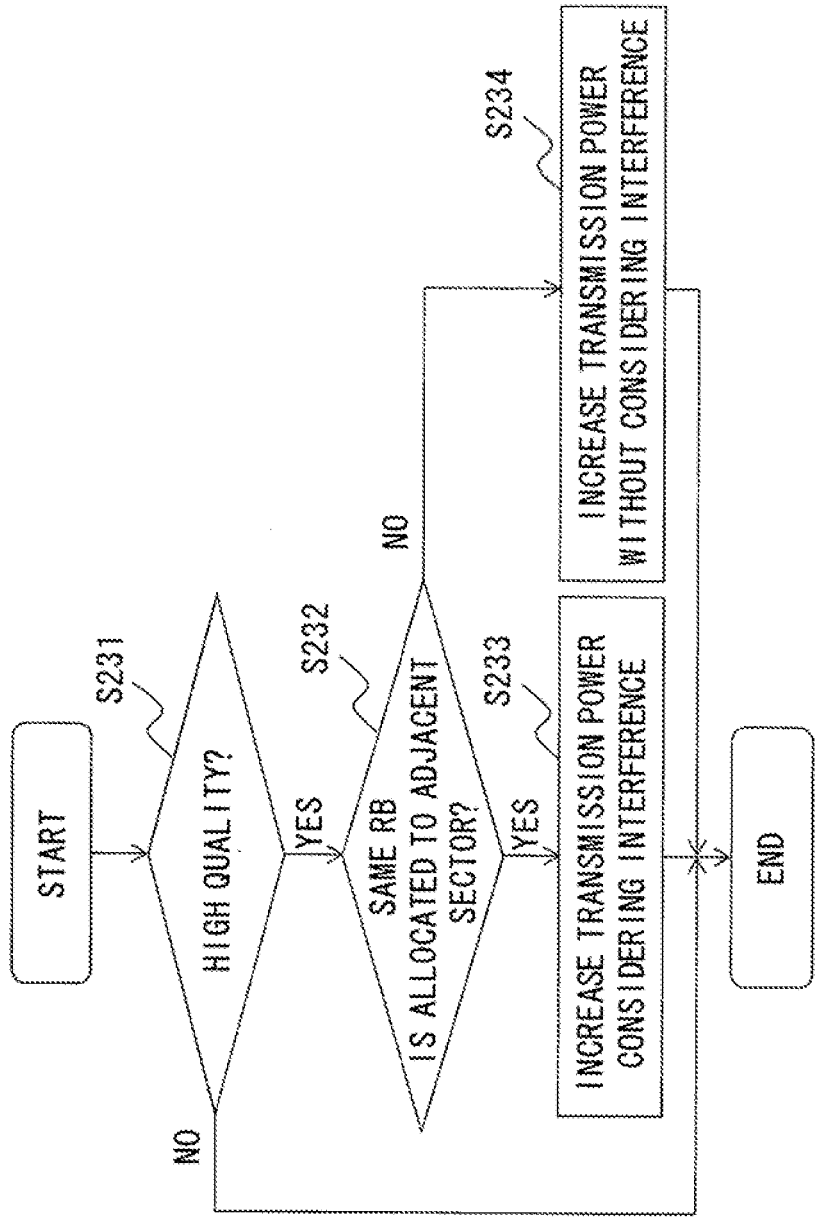
FIG. 9 is a flowchart showing an operating procedure to increase a transmission power for a user with a high estimated quality according to the first exemplary embodiment.

FIG. 9 is a flowchart showing an operating procedure for a base station to increase the transmission power of a user j with the high estimated quality $SINR_{est}$ after determining the allocation of RB of all sectors. As the estimated quality $SINR_{est}$, the value calculated by Expression (9) is held for use.

When the estimated quality $SINR_{est}$ of the selected user j is equal to or higher than a high quality threshold $Thr\_SINR_{high}$ (a higher quality threshold than the minimum required quality) (Yes in S231), the resource allocation unit 113 determines whether the allocated RB is already allocated in the adjacent sector (S232).

$$SINR_{est}\geq Thr\_SINR_{high} \quad \text{Expression (12)}$$

When it is already allocated (Yes in S232), the increased transmission power is calculated in Expression (13) so as to be equal to or lower than an allowable interference power (S233). Note that $\Delta_{up}$ is a parameter for setting the upper limit of increasing the transmission power.

$$P_j=\text{MIN}(P_{max}, P_1+PL_{1,q}+ThrI_{1,q}-PL_{j,q}, P_j+\Delta_{up}) \quad \text{Expression (13)}$$

Likewise, when it is not yet allocated (No in S232), the increased transmission power is calculated in Expression (14) without considering interference with an adjacent sector (S234).

$$P_j=\text{MIN}(P_{max}, P_j+\Delta_{up}) \quad \text{Expression (14)}$$

Because a user equipment with a high quality is located in the beam direction in close proximity to the base station, it is considered that the interference to the adjacent base station is low. Therefore, by the processing of FIG. 9, throughput can be improved without substantially affecting the throughput of a user equipment in the adjacent base station cell. Further, although a user equipment with a high quality is determined using SINR in this exemplary embodiment, it may be determined using PL or the like.

Although it is assumed in this exemplary embodiment that the base station allocates resources of all of the three sectors under its control at once, the present invention is not limited thereto, and after a resource is allocated individually to each sector, the resource allocation may be readjusted among sectors.

Figure 10:
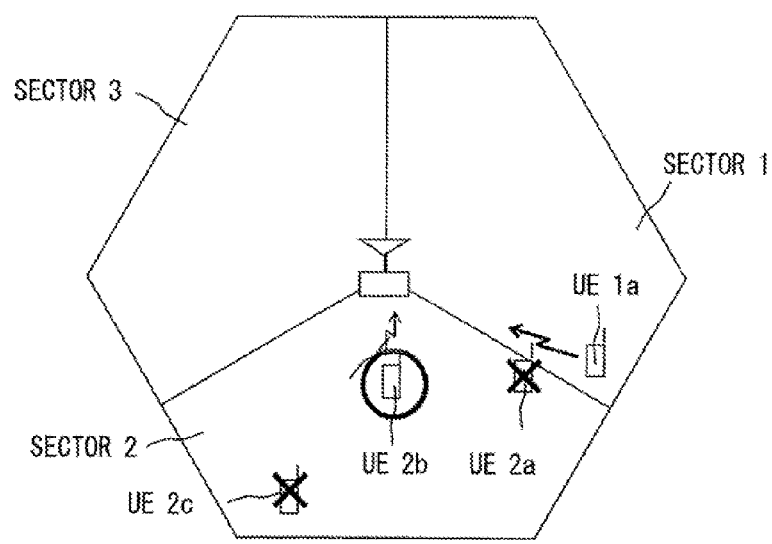
FIG. 10 is a view showing a relationship of user equipments to which a resource is allocated by applying the first exemplary embodiment.
Figure 11:
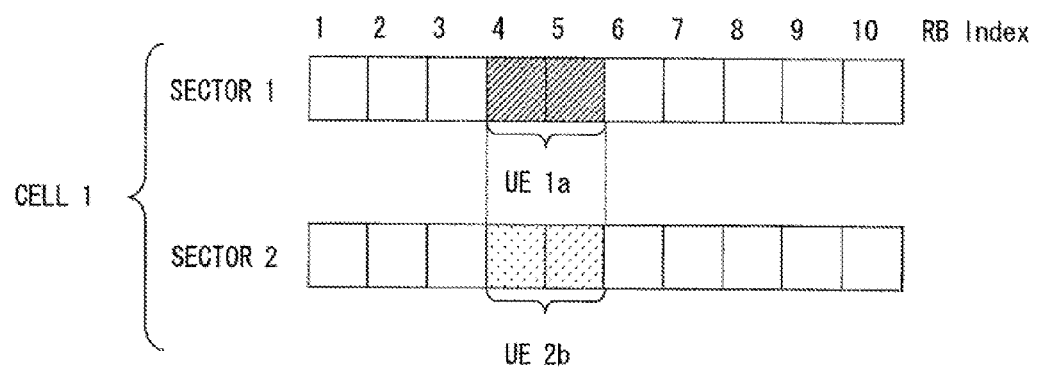
FIG. 11 is an image view in which a frequency block is allocated by applying the first exemplary embodiment.
Figure 17:
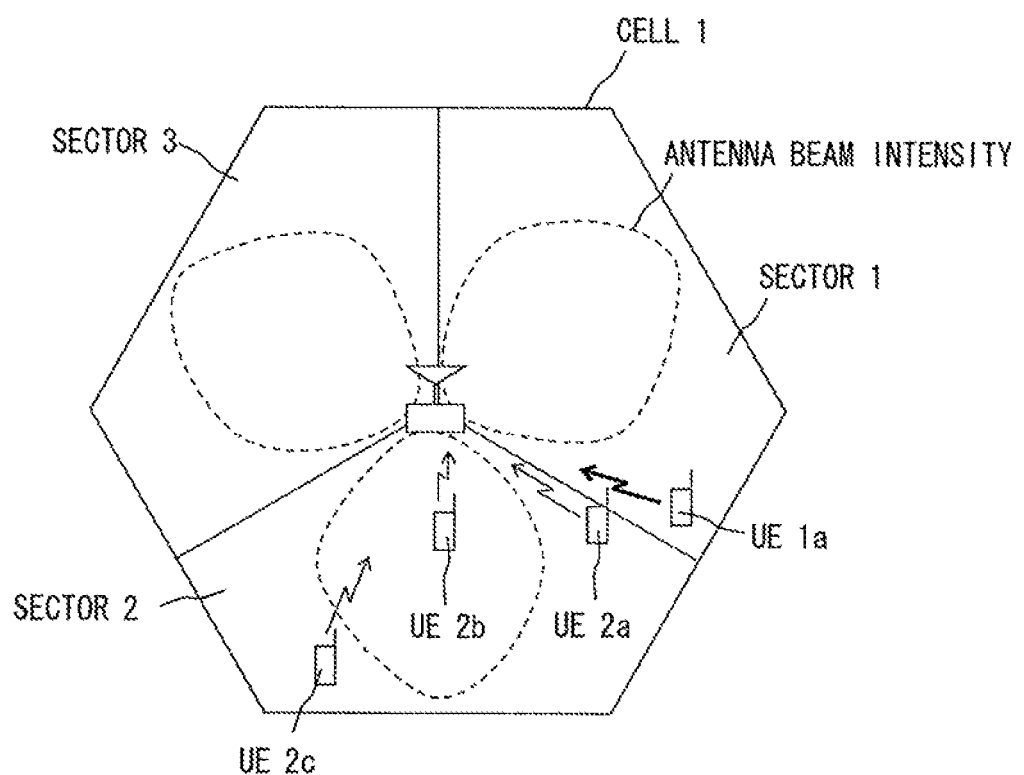
FIG. 17 is a view showing a relationship of user equipments to which a resource is allocated by a related technique.

FIGS. 10 and 11 are a view showing a relationship of user equipments to which a resource is allocated and an image view in which a frequency block is allocated, respectively, by applying the exemplary embodiment to the case shown in FIG. 17. In the sector 1, the user equipment 1*a* is subject to interference from the adjacent sector 2. In the case of allocating a frequency group to the user equipment 1*a*, in the adjacent sector 2, the same frequency group as the user equipment 1*a* is allocated to a user equipment in which the effect of an interference power to the adjacent sector 1 is small and the transmission power for achieving the required throughput can be set. Specifically, the situation is as follows. Because a user equipment 2*a* has a higher interference power to the adjacent sector 1 than the interference threshold, the allocation for the same frequency group is avoided. Further, although a user equipment 2*c* has a low interference power to the adjacent sector 1, because the required quality cannot be obtained with the reduced transmission power Pc (because it is lower than the quality threshold), the allocation for the same frequency group is avoided. On the other hand, a user equipment 2*b* has a lower interference power to the sector 1 than the interference threshold, and throughput can be expected (the transmission power is higher than the quality threshold). Therefore, in FIG. 10, the same frequency group as that of the user equipment 1*a* is allocated to the user equipment 2*b*. It is thereby possible to suppress the effect of the other-cell interference power on the user equipment 1*a* and maximize the throughput in the adjacent sector 2.

As described above, in the communication system where a cell is divided into sectors and the same radio resource is used among the sectors, a base station placed in the cell allocates the uplink resource to user equipments by the following procedure. It is assumed that the first sector and the second sector in the cell are adjacent. When allocating the uplink resource of the second sector in the case where a resource is allocated to a user equipment of the first sector, the base station (the resource allocation unit 113) allocates the same resource to a user equipment in which the interference power to the first sector is equal to or lower than an interference threshold, and the communication quality of the second sector is equal to or higher than a quality threshold. Specifically, the base station allocates the resource to a user equipment in which the interference power is an interference threshold when performing transmission with a transmission power by which the communication quality is a predetermined quality (which may be a higher level than the minimum required quality). Further, the base station allocates the resource to a user equipment in which the communication quality is equal to or higher than a quality threshold when performing transmission with a transmission power by which the interference power is the interference threshold. Furthermore, the base station allocates the resource to a user equipment in which the interference power is equal to or lower than the interference threshold when performing transmission with a transmission power by which the communication quality is the quality threshold.

Further, when the communication quality is equal to or higher than a high quality threshold (a predetermined value with a higher level than the minimum required quality), the base station can increase the transmission power so that the interference power becomes equal to or lower than the interference threshold.

As described above, according to the exemplary embodiment, when a radio resource is allocated to a user equipment which is largely affected by the adjacent sector interference, it is possible to improve (e.g. maximize) the throughput of an adjacent sector using the same resource as well as suppressing the degradation of the throughput of the user equipment to which the resource is allocated.

Second Exemplary Embodiment

Figure 12:
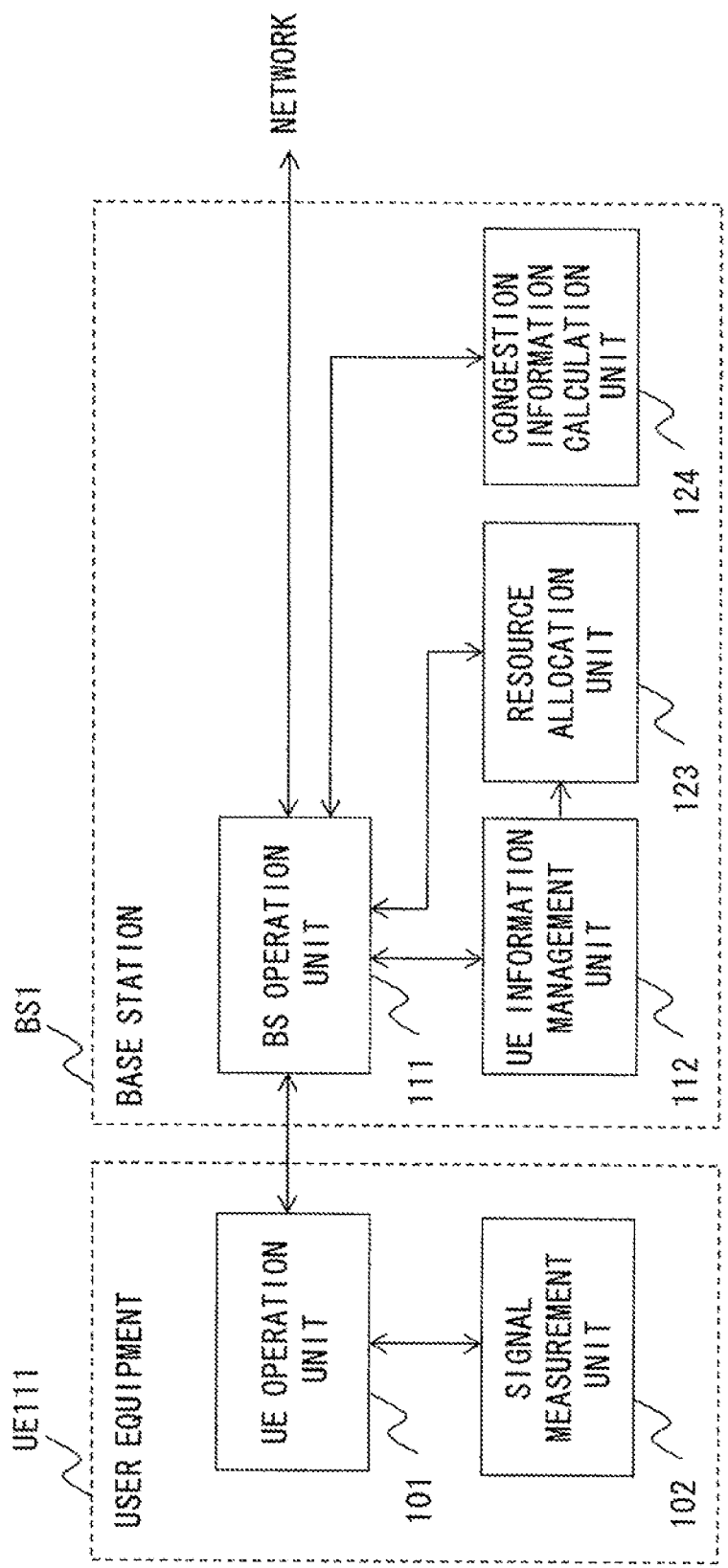
FIG. 12 is a block diagram showing a basic configuration of a communication system according to a second exemplary embodiment.

A second exemplary embodiment of the present invention is described hereinbelow. FIG. 12 is a block diagram showing a basic configuration of a radio communication system according to the second exemplary embodiment. The second exemplary embodiment is different from the first exemplary embodiment shown in FIG. 4 in that a congestion information calculation unit 124 is added to the base station BS1, and a resource allocation 10 unit 123 uses congestion information. The congestion information calculation unit 124 calculates congestion information, and the BS operation unit 111 has a function of notifying the congestion information to an adjacent base station. In the base station receiving notification, the BS operation unit 111 receives the congestion information and notifies it to the resource allocation unit 123. The resource allocation unit 123 adjusts the transmission power of a user equipment according to the congestion information The operation of the exemplary embodiment is described hereinafter with reference to the drawings. The operating procedures to calculate PL information and determine a user to which a resource is allocated are the same as shown in FIGS. 5 to 7 and FIG. 9 according to the first exemplary embodiment. In the second exemplary embodiment, the operations shown in FIG. 13 and FIG. 14 are further added.

Figure 13:
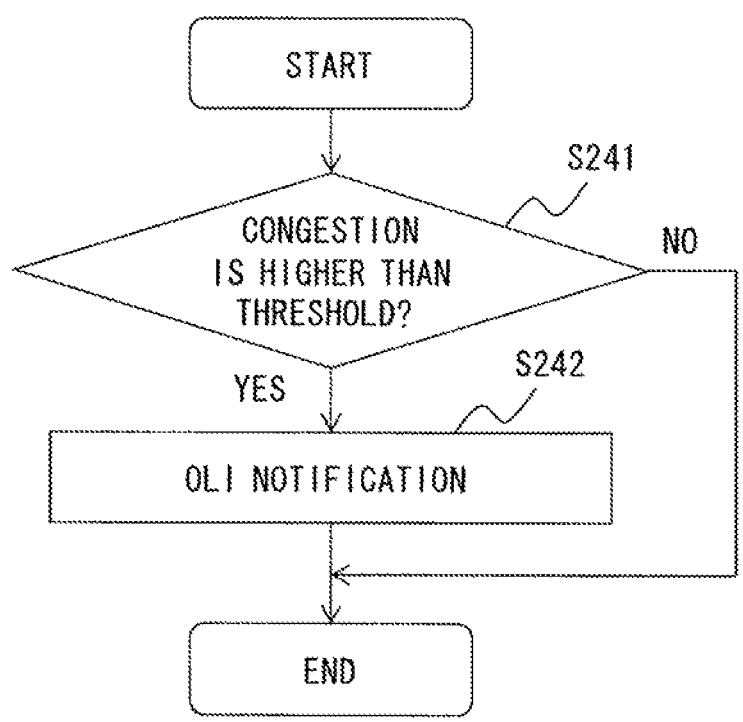
FIG. 13 is a flowchart showing a procedure to calculate load information according to the second exemplary embodiment.
Figure 14:
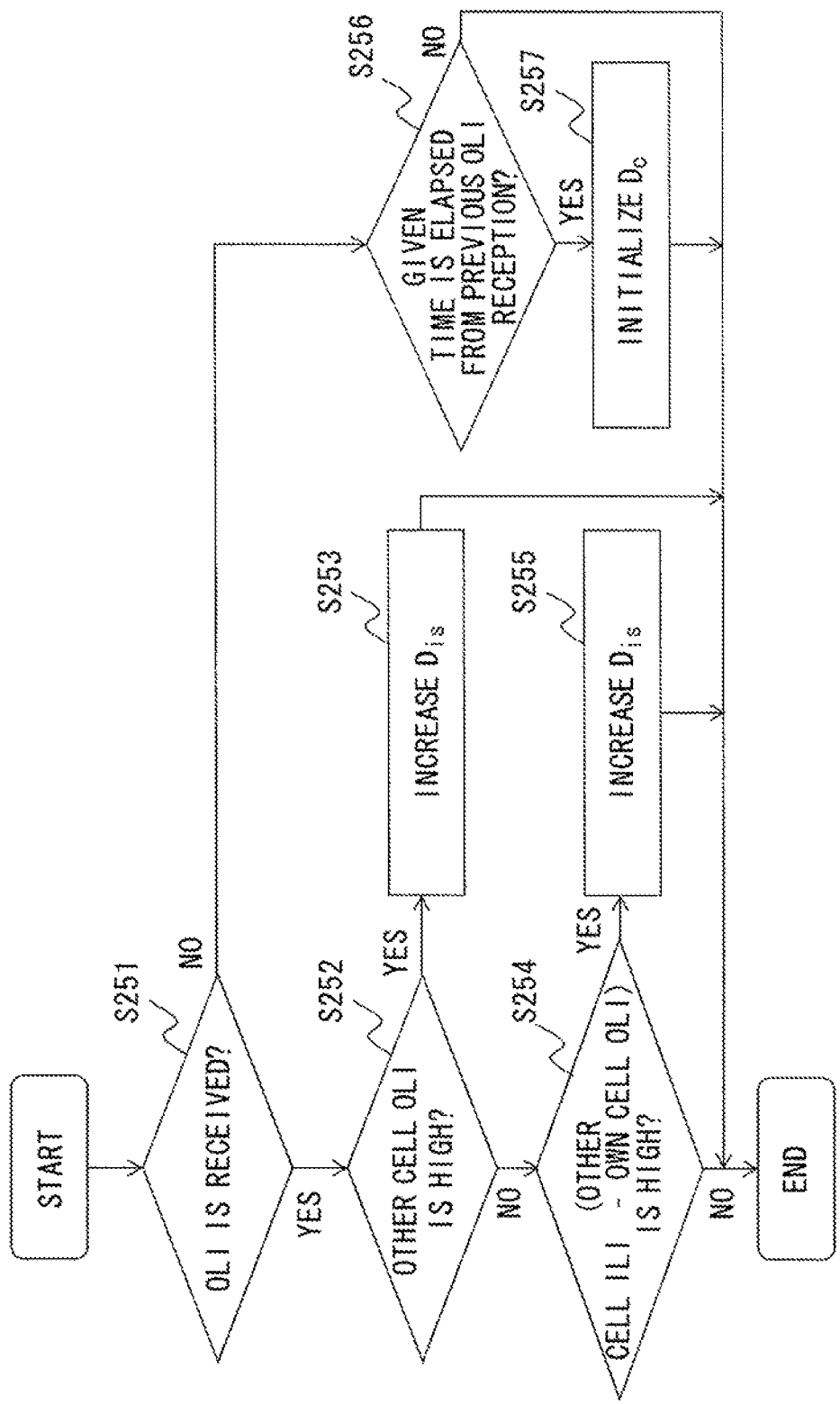
FIG. 14 is a flowchart showing a procedure to update a calculation formula of a transmission power of a user equipment corresponding to load information according to the second exemplary embodiment.

FIG. 13 is a flowchart showing the operating procedure in which the congestion information calculation unit 124 calculates congestion information and the BS operation unit 111 notifies the congestion information to an adjacent base station. The congestion information calculation unit 124 measures the interference power IoT as congestion information and compares it with the allowable interference power IoT_limit and, when IoT is higher (Yes in S241), the BS operation unit 111 notifies over load indicator (OLI) indicating that congestion is high to an adjacent base station (S242). IoT_limit is calculated by Expression (15).

$$\text{IoT\_limit[dB]}=(\text{RoT}-\text{IoT})-\text{Thr\_iot\_limit} \quad \text{Expression (15)}$$

Thr_iot_limit[dB] indicates the ratio of the allowable interference power to a desired signal (=RoT−IoT). When the conditional expression of Expression (16) is satisfied, it is determined that congestion is high.

$$\text{Diff\_li[dB]}=\text{IoT}-\text{IoT\_limit}>0 \quad \text{Expression (16)}$$

Diff_li indicates a difference between IoT and IoT_limit. From Expression (16), it is determined whether IoT is larger than IoT_limit. Although IoT_limit is a value that varies depending on a desired signal (=RoT−IoT) above, it may be a fixed value.

FIG. 14 is a flowchart showing an operating procedure in which the resource allocation unit 123 of the base station that has received the congestion information from the adjacent base station updates the calculation formula of the transmission power to be allocated to a user equipment. The transmission power in this exemplary embodiment is calculated using the following Expressions (17) and (18) instead of Expressions (7) and (11) according to the first exemplary embodiment. Specifically, $\Delta_{ic}$ in consideration of interference to an adjacent cell is added. The initial value of $\Delta_{ic}$ is $\Delta_{ic,init}$. If there is no need to consider interference to another cell, $\Delta_{ic,init}$=0 dB so as to increase the transmission power.

$$P_{nc}=\text{MEDIUM}(P_{min}, P_o+\text{PL}_{j,p}-\Delta_{ic}, P_{max}) \quad \text{Expression (17)}$$

$$P_c=\text{MEDIUM}(P_{min}, P_o+\text{PL}_{j,p}-\Delta_{is}-\Delta_{ic}, P_{max}) \quad \text{Expression (18)}$$

It is assumed that Diff_li measured in the own sector p is $\text{OLI}_p$, and OLI received from an adjacent base station is $\text{OLI}_x$. When the resource allocation unit 123 receives OLI (=$\text{OLI}_x$) from another cell (Yes in S251), it determines whether $\text{OLI}_x$ is high by using the conditional expression of Expression (19) (S252). Thr_oli_1 is a threshold.

$$\text{OLI}_x > \text{Thr\_oli\_1} \quad \text{Expression (19)}$$

When Expression (19) is satisfied (Yes in S252), the resource allocation unit 123 updates the parameter $\Delta ic$ for reducing the interference power to an adjacent sector according to Expression (20) (S253). $\Delta_{ic\_Lstep}$ indicates an increase step, and $\Delta_{ic\_max}$ indicates the maximum value of $\Delta_{ic}$.

$$\Delta_{ic}=\text{MIN}(\Delta_{ic}+\Delta_{ic\_Lstep}, \Delta_{ic\_max}) \quad \text{Expression (20)}$$

Further, when S252 is not satisfied (No in S252), the resource allocation unit 123 compares $\text{OLI}_x$ with $\text{OLI}_p$ (=Diff_li) measured in the own sector p, and it uses the conditional expression of Expression (21) for comparison (S254). Thr_oli_s is a threshold.

$$\text{OLI}_x - \text{OLI}_p > \text{Thr\_oli\_s} \quad \text{Expression (21)}$$

When Expression (21) is satisfied (Yes in S254), the resource allocation unit 123 updates the parameter $\Delta_{ic}$ as follows (S255).

$$\Delta_{ic}=\text{MIN}(\Delta_{ic}+\Delta_{ic\_Sstep}, \Delta_{ic\_max}) \quad \text{Expression (22)}$$

By Expression (19), when the interference power by another cell is very high, the adjacent cell can reduce the transmission power all at once. Therefore, it is desirable that $\Delta_{ic\_Lstep}$ is set to be a larger value than $\Delta_{ic\_Sstep}$. They may be the same value as a matter of course. Further, by Expression (21), because the transmission power can be determined in view of the balance of the respective interference powers of another cell and own cell, it is possible to balance out the congestion state between the cells. When S254 is not satisfied (No in S254), the process ends without updating $\Delta_{ic}$.

On the other hand, when OLI is not received from another cell (No in S251) and a predetermined time is elapsed from the previous OLI reception (Yes in S256), the resource allocation unit 123 determines that congestion of another cell is suppressed and resets $\Delta_{ic}$ to the initial value $\Delta_{ic,init}$ (S257)

Although $\Delta_{ic}$ is increased in stages in this exemplary embodiment, control may be made to update it to a preset value. In this case, Expression (20) becomes Expression (23), for example.

$$\Delta_{ic}=\Delta_{ic\_max\_L} \quad \text{Expression (23)}$$

Further, although $\Delta_{ic}$ is reset to the initial value $\Delta_{ic,init}$ when a predetermined time is elapsed from the previous OLI reception in this exemplary embodiment, it may be reduced in stages. Further, although IoT is used as congestion information in this exemplary embodiment, the RB usage rate, the reception power of a user equipment in its own cell only may be used. For example, it may be determined which of own cell and an adjacent base station the congestion is higher by comparing the RB usage rate of the own cell and the adjacent base station. The same applies to the reception power of a user equipment in its own cell only. The RB usage rate is represented by the following Expression.

RB usage rate=(the total number of allocated RBs)/ (the total number of allocable RBs)     Expression (24)

Further, in the case of using both IoT and RB usage rate, for example, it may be determined that congestion is high when the following Expression (25) is satisfied in addition to Expression (16). In this case, when the load of its own cell is very small, OLI is not transmitted even when the interference of another sector is high, and it is possible to prevent undesired reduction of the transmission power in an adjacent base station.

RB usage rate>Thr_Rbutil_oli     Expression (25)

Third Exemplary Embodiment

A third exemplary embodiment of the present invention is described hereinbelow. The configuration of the exemplary embodiment is the same as that of the second exemplary embodiment shown in FIG. 12.

The operation in this exemplary embodiment is described hereinafter with reference to the drawings. The third exemplary embodiment is different from the second exemplary embodiment in that the operation shown in FIG. 15, rather than FIG. 13, is performed, and the operation shown in FIG. 16, rather than FIG. 14, is performed.

Figure 15:
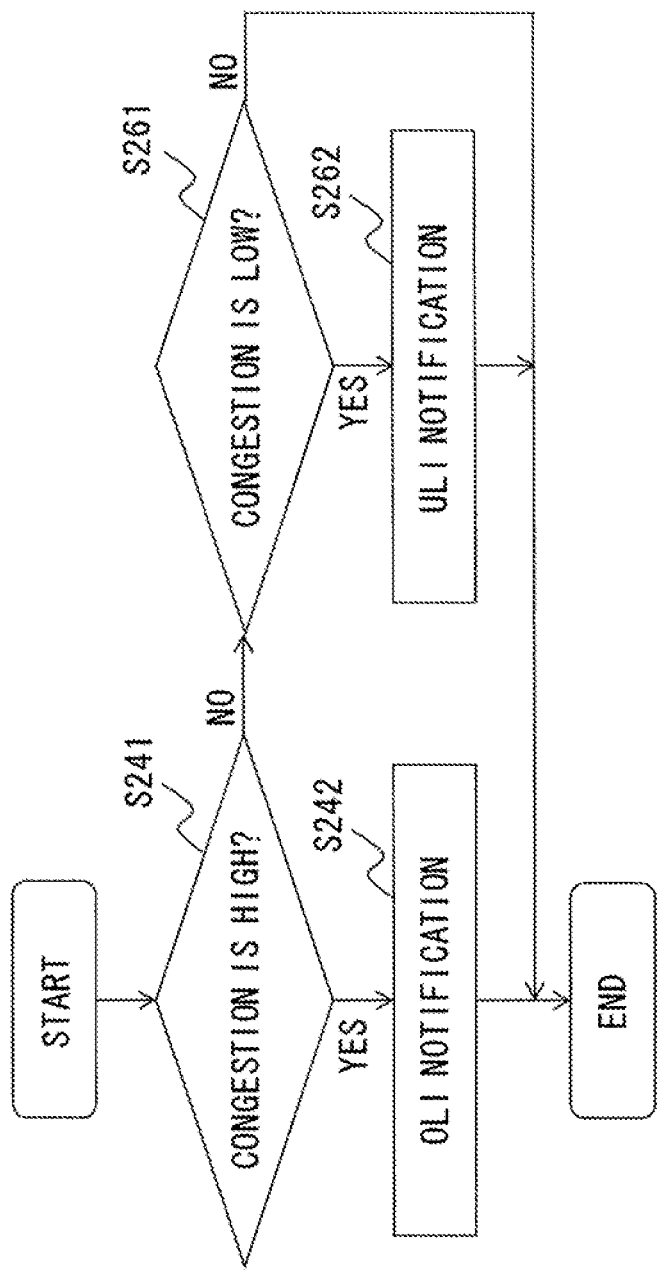
FIG. 15 is a flowchart showing a procedure to calculate load information according to a third exemplary embodiment.

Referring to FIG. 15, the processing of S261 and S262 is added to FIG. 13. Specifically, when it is determined that congestion is low (Yes in S261), the congestion information calculation unit 124 notifies ULI (under load indicator) that indicates the congestion becomes low to an adjacent base station (S262). It is determined that congestion becomes low when any one of the following conditional expressions is satisfied.

IoT−IoT_limit<Thr_iot_low[dB]     Expression (26)

Based on Expression (13), it is determined whether IoT is sufficiently smaller than an allowable value.

Figure 16:
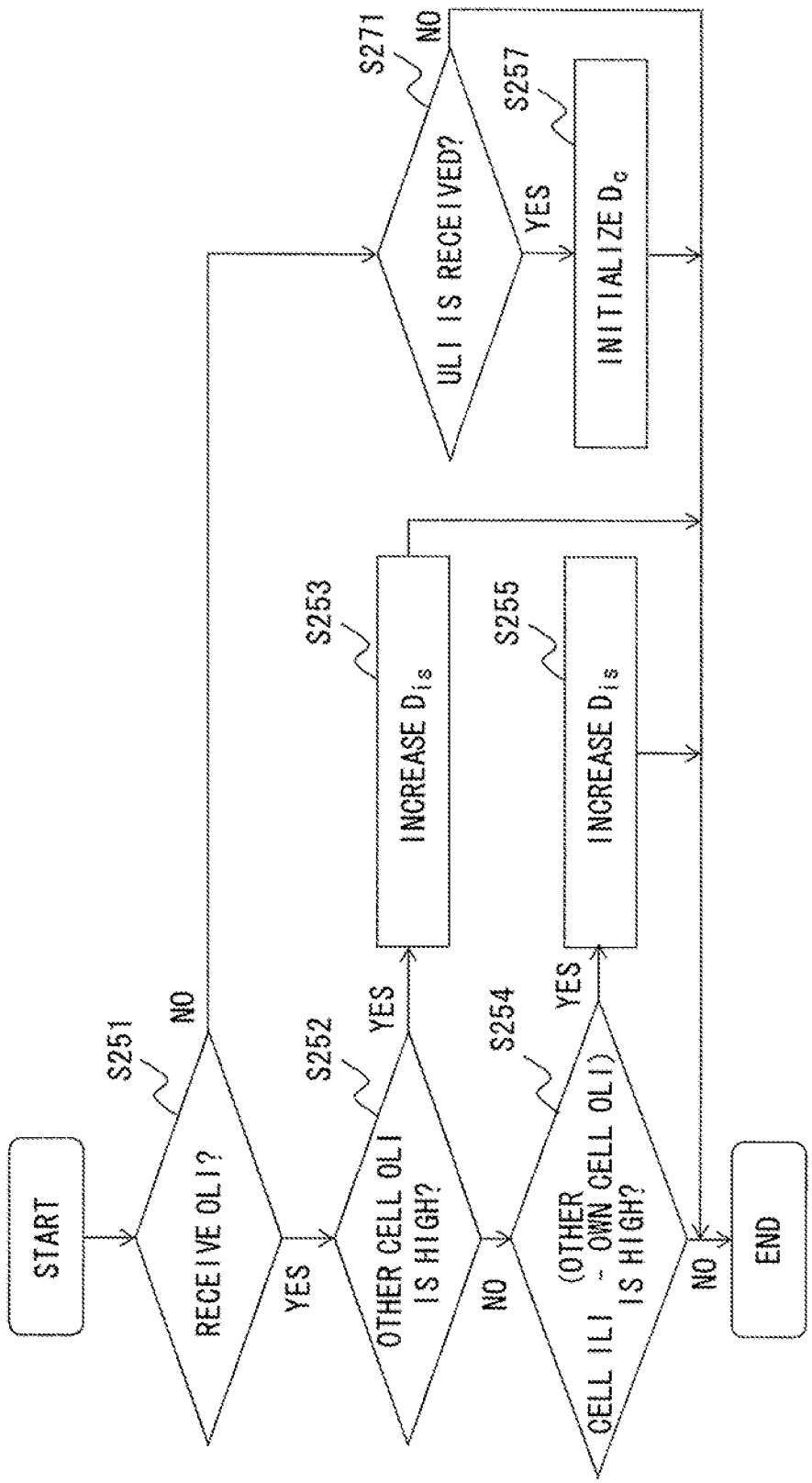
FIG. 16 is a flowchart showing a procedure to update a calculation formula of a transmission power of a user equipment corresponding to load information according to the third exemplary embodiment.

Referring then to FIG. 16, S256 of FIG. 14 is replaced by S271. Specifically, when the resource allocation unit 123 receives ULI after receiving OLI from another cell (Yes in S271), it determines that congestion of another cell is suppressed and resets $\Delta_{ic}$ to the initial value $\Delta_{ic,init}$ (S257)

As in this exemplary embodiment, by using ULI, it is possible to reset the reduced transmission power promptly.

Fourth Exemplary Embodiment

When a scheduling device that performs centralized control of resource allocation is connected to a plurality of base stations over a high-speed network such as an optical network, the resource allocation in consideration of interference between adjacent base station cells can be implemented by the scheduling device, in the same manner as the resource allocation in consideration of interference between adjacent sectors which is described in the first exemplary embodiment.

For example, in a communication system in which cells serve as a communication area, a base station is placed in each cell, and the same radio resource can be used among those cells, the base station can allocate an uplink resource to a user equipment as follows.

Assume the case where a first base station is placed in a first cell, a second base station is placed in a second cell, and the first cell and the second cell are adjacent to each other. When a resource is allocated to a user equipment in the first cell, the second base station (resource allocation unit) allocates the same resource as the resource allocated to the user equipment in the first cell to a user equipment in which the interference power to the first cell is equal to or lower than an interference threshold, and the quality of the second cell is equal to or higher than a quality threshold. Specifically, the second base station allocates the resource to a user equipment in which the interference power is an interference threshold when performing transmission with a transmission power by which the quality is a predetermined quality (which may be a higher level than the minimum required quality). Further, the second base station allocates the resource to a user equipment in which the communication quality is equal to or higher than a quality threshold when performing transmission with a transmission power by which the interference power is an interference threshold. Furthermore, the second base station allocates the resource to a user equipment in which the interference power is equal to or lower than the interference threshold when performing transmission with a transmission power by which the communication quality is the quality threshold (minimum required quality).

Further, when the quality is equal to or higher than a high quality threshold (a predetermined value with a higher level than the minimum required quality), the second base station can increase the transmission power so that the interference power becomes equal to or lower than the interference threshold.

As described above, in the communication system which is composed of different cells where base stations are placed respectively and which uses the same uplink resource among the different cells, when a radio resource is allocated to a user equipment that is largely affected by adjacent cell interference, it is possible to improve (e.g. maximize) the throughput of the adjacent cell using the same resource as well as suppressing the degradation of the throughput of the user equipment.

Other Exemplary Embodiments

Although LTE is used as an example in the explanation of the above exemplary embodiments, the present invention may be applied to an uplink radio communication system using FDM (Frequency Division Multiplex).

One advantageous effect of the present invention is, when allocating a radio resource to a user equipment in which the effect of interference of an adjacent communication area (e.g. adjacent sector) is large, to improve the throughput of the adjacent communication area using the same resource as well as suppressing the degradation of the throughput of the user equipment. The first reason that this advantageous effect is obtained is because, in an adjacent communication area in which the effect of interference is large, the same resource is allocated to a user equipment with a low interference power. The second reason is because a user equipment with a high quality can increase a transmission power within the range where an interference power is equal to or lower than a threshold. The third reason is because, in an adjacent communication area in which the effect of interference is large, the same resource is allocated to a user equipment in which a transmission power by which a predetermined quality is obtained can be set.

Further, another advantageous effect of the present invention is to take the interference to a communication area in which a control device is different (e.g. another cell in which a different base station is placed) into consideration. The reason is because a transmission power is controlled based on load information from an adjacent communication area.

A yet another advantageous effect of the present invention is, when allocating a radio resource to a user equipment in which the effect of interference from an adjacent communication area (e.g. the effect of adjacent cell interference in which a different base station is placed) is large, to maximize the throughput of the adjacent communication area using the same resource as well as suppressing the degradation of the throughput of the user equipment. The reason is because, in an adjacent communication area, the same resource is allocated to a user equipment to which a transmission power for suppressing an interference power from the adjacent communication area to the user equipment which is largely affected by the interference and satisfying the predetermined throughput can be set.

Although the present invention is described above with reference to the exemplary embodiments and modes for the invention, the present invention is not limited to the above-described exemplary embodiments and modes for the invention. Various changes and modifications as would be obvious to one skilled in the art may be made to the configuration and the details of the present invention without departing from the scope of the invention.

The invention claimed is:

1. A control device placed in a communication system where the same resource is used in a plurality of communication areas, comprising:
   a communication function unit that has a function of communicating with a plurality of user equipments existing in at least one communication area under control of the control device; and
   a resource allocation unit that allocates, when an uplink resource of an adjacent communication area to one communication area is allocated to a first user equipment, the same uplink resource of the one communication area to a second user equipment in which an interference power to the adjacent communication area is equal to or lower than an interference threshold and a communication quality is equal to or higher than a quality threshold,
   wherein the resource allocation unit extracts a user equipment with the corn quality higher than a predetermined level from the plurality of user equipments, and increases a transmission power of the extracted user equipment.

2. The control device according to claim 1, wherein the resource allocation unit selects, as the second user equipment, a user equipment in which the interference power is equal to or lower than the interference threshold by transmission of a given transmission power.

3. The control device according to claim 2, further comprising:
   a congestion information calculation unit that calculates congestion information, wherein the communication function unit transmits congestion information of the control device and receives congestion information from an adjacent other control device, and the resource allocation unit adjusts the transmission power of the user equipment based on the congestion information of said other control device.

4. The control device according to claim 3, wherein the congestion information calculation unit calculates at least one of a reception power and a resource usage rate as the congestion information.

5. The control device according to claim 3, wherein the resource allocation unit decreases the transmission power of the user equipment when the congestion information of said other control device is larger than a congestion threshold.

6. The control device according to claim 3, wherein the resource allocation unit decreases the transmission power of the user equipment when a difference between the congestion information of said other control device and the congestion information of the control device is larger than a congestion difference threshold.

7. The control device according to claim 1, wherein the resource allocation unit selects, as the second user equipment, a user equipment in which the interference power is equal to or lower than the interference threshold when a transmission power of the user equipment is adjusted to a value by which the communication quality is equal to or higher than the quality threshold.

8. The control device according to claim 7, wherein the resource allocation unit sets a first quality threshold and a second quality threshold higher than the first quality threshold as the quality threshold, and selects the second user equipment by using any one of the first quality threshold and the second quality threshold.

9. The control device according to claim 1, wherein the resource allocation unit selects, as the second user equipment, a user equipment in which a transmission power of the user equipment is equal to or higher than the quality threshold when the transmission power of the user equipment is adjusted to a value by which the interference power is equal to or lower than the interference threshold.

10. The control device according to claim 1, wherein, when the same resource is allocated to another user equipment in a communication area adjacent to a communication area of the extracted user equipment, the resource allocation unit increases the transmission power so that an interference power of the extracted user equipment is equal to or lower than the interference threshold.

11. The control device according to claim 1, wherein
the plurality of communication areas are a plurality of sectors divided from a cell,
the control device is a base station placed in the cell, and
the resource allocation unit allocates a resource to a plurality of user equipments existing in the plurality of sectors.

12. The control device according to claim 1, wherein
the plurality of communication areas are a plurality of cells where base stations are placed respectively,
the control device is a base station placed in one cell,
the communication function unit acquires user equipment allocation information from an adjacent cell, and
the resource allocation unit determines whether the adjacent cell is allocated for a user equipment based on the user equipment allocation information and allocates a resource to a plurality of user equipments in the cell.

13. The control device according to claim 1, wherein
the communication function unit transmits a downlink common signal for each of the communication areas, receives a measurement result of the downlink common signal from the plurality of user equipments, and calculates the communication quality and the interference power based on the measurement result.

14. The control device according to claim 1, wherein
the uplink resource is composed of a plurality of frequency blocks,
the resource allocation unit includes
a list creation unit that calculates selection indexes when the plurality of frequency blocks are respectively allocated to the plurality of user equipments, and creates a list of the calculated selection indexes arranged in descending order, and
an allocation unit that selects a candidate frequency block to be allocated to a user equipment in the order of the list and, in the adjacent communication area, allocates a user equipment in which the interference power is equal to or lower than an interference threshold and the communication quality is equal to or higher than a quality threshold when a user equipment is allocated for the candidate frequency block, and allocates a user equipment in which the communication quality is equal to or higher than the quality threshold when a user equipment is not allocated for the candidate frequency block.

15. The control device according to claim 14, wherein, after allocating a frequency block to the plurality of user equipments in the order of the list, the resource allocation unit selects a frequency block to be allocated for a user equipment to which a resource is not allocated again in the order of the list by reducing a transmission power within a range where the communication quality is equal to or higher than the quality threshold.

16. A communication system comprising:
the control device according to claim 1; and
a user equipment to which an uplink resource is allocated by the control device.

17. A resource allocation method in a communication system where the same resource is used in a plurality of communication areas, comprising:
checking an uplink resource allocation status of an adjacent communication area to one communication area;
allocating, when an uplink resource of the adjacent communication area is allocated to a first user equipment, the same uplink resource of the one communication area to a second user equipment in which an interference power to the adjacent communication area is equal to or lower than an interference threshold and a communication quality is equal to or higher than a quality threshold; and
extracting a user equipment with the communication quality higher than a predetermined level from a plurality of user equipments, and increasing a transmission power of the extracted user equipment.

18. A non-transitory recording medium containing a program for allocating a resource in a communication system where the same resource is used in one communication area and an adjacent communication area, the program causing a computer to execute a process comprising:
a procedure to check an uplink resource allocation status of the adjacent communication area;
a procedure to allocate, when an uplink resource of the adjacent communication area is allocated to a first user equipment, the same uplink resource of the one communication area to a second user equipment in which an interference power to the adjacent communication area is equal to or lower than an interference threshold and a communication quality is equal to or higher than a quality threshold; and a procedure to extract a user equipment with the communication quality higher than a predetermined level from a plurality of user equipments, and increase a transmission power of the extracted user equipment.

* * * * *